(12) United States Patent
Lee et al.

(10) Patent No.: US 8,839,194 B2
(45) Date of Patent: Sep. 16, 2014

(54) COMPONENT-BASED WEB APPLICATION DEVELOPMENT FRAMEWORK USED FOR CREATING WEB PAGE

(75) Inventors: Seung Bae Lee, Yongin-si (KR); Sung Kwan Kim, Yongin-si (KR); Kyu Won Moon, Seongnam-si (KR); Mi Sun Yoon, Seoul (KR); Chang Guen Song, Seoul (KR); Wook Soo Shin, Seoul (KR); Jae Wan Jang, Namyangju-si (KR)

(73) Assignee: NHN Corporation, Seongnam-si (KR)

( * ) Notice: Subject to any disclaimer, the term of this patent is extended or adjusted under 35 U.S.C. 154(b) by 877 days.

(21) Appl. No.: 12/623,002

(22) Filed: Nov. 20, 2009

(65) Prior Publication Data

US 2010/0125829 A1    May 20, 2010

(30) Foreign Application Priority Data

Nov. 20, 2008    (KR) .......................... 10-2008-0115957

(51) Int. Cl.
*G06F 9/44* (2006.01)
*G06Q 10/06* (2012.01)

(52) U.S. Cl.
CPC *G06F 8/24* (2013.01); *G06Q 10/06* (2013.01); *G06F 8/10* (2013.01); *G06F 8/34* (2013.01)
USPC ........................................ 717/115; 717/116

(58) Field of Classification Search
CPC ............... G06F 8/24; G06F 8/34; G06F 8/10; G06Q 10/06
USPC .................................................. 717/115, 116
See application file for complete search history.

(56) References Cited

U.S. PATENT DOCUMENTS

| | | | |
|---|---|---|---|
| 6,907,546 B1 * | 6/2005 | Haswell et al. ............ 714/38.11 |
| 2004/0250241 A1 * | 12/2004 | O'Neil et al. ................. 717/118 |
| 2007/0288890 A1 * | 12/2007 | Wells ............................. 717/113 |
| 2008/0004887 A1 * | 1/2008 | Brunswig et al. ................. 705/1 |
| 2009/0077091 A1 * | 3/2009 | Khen et al. ....................... 707/10 |
| 2009/0183092 A1 * | 7/2009 | Naghshineh ................... 715/762 |

FOREIGN PATENT DOCUMENTS

| | | |
|---|---|---|
| JP | 2004-110156 | 4/2004 |
| JP | 2006-163855 | 6/2006 |
| JP | 2006-235874 | 9/2006 |
| JP | 2008-130048 | 6/2008 |
| KR | 1020060114517 | 11/2006 |
| KR | 10-2008-0070337 | 7/2008 |

\* cited by examiner

*Primary Examiner* — Anna Deng
(74) *Attorney, Agent, or Firm* — Greer Burns & Crain Ltd.

(57) ABSTRACT

The present invention relates to a user interface server framework and a method of using the framework, which supports a user interface developer to develop a final user interface based on components. The component-based web application development framework used for creating a web page comprises a runtime engine for executing a method of a business object and returning a result of executing the method in response to a user's request; a script component for performing a preprocessing on a user input value before executing the method of the business object, performing a post-processing on the result of executing the method after executing the method of the business object, and dynamically arranging a user interface object; and a core component for initializing the framework and confirming whether the user's request can be processed in the framework.

23 Claims, 5 Drawing Sheets

COMPONENT-BASED WEB APPLICATION DEVELOPMENT FRAMEWORK USED FOR CREATING WEB PAGE

CROSS REFERENCE TO RELATED APPLICATION

This application claims priority from and the benefit of Korean Patent Application No. 10-2008-0115957, filed on Nov. 20, 2008, which is hereby incorporated by reference for all purposes as if fully set forth herein.

BACKGROUND OF THE INVENTION

1. Field of the Invention

Exemplary embodiments of the present invention relate to a user interface server framework and a method of using the framework, which support a user interface developer in developing a final user interface based on components.

2. Discussion of the Background

Recently, as the concept of component based development (CBD), service oriented structure (SOS) and the like is gradually applied to industries, reusability and connection functions of so-called business objects have been remarkably strengthened, and solutions and technologies related thereto have also been advanced. Although web service user interfaces have rapidly become complicated as the concept of Web 2.0, Ajax and the like have been introduced to industries, component development and reusability of user interface objects remain in their early stage. Accordingly, the cost for developing user interface objects is high.

In addition, a user interface domain is closely connected to a business domain in most web-based user services. That is, the user interface domain and the business domain are not clearly divided as separated layers and exist as one combined body. In an alternate situation, although the user interface domain and the business domain are clearly divided as separated layers, dependency between the layers is so high that they can be referred to as the same module in most structures.

If a structure closely connecting the user interface domain and the business domain is used, it is effective for a while to lower the cost of developing user interface objects. However, total costs including maintenance cost are increased. In addition, existing user interface objects may not be reused even when user interface objects of a similar structure are developed, and thus, there is a problem in that a large amount of cost and time may be required.

Figure 1:
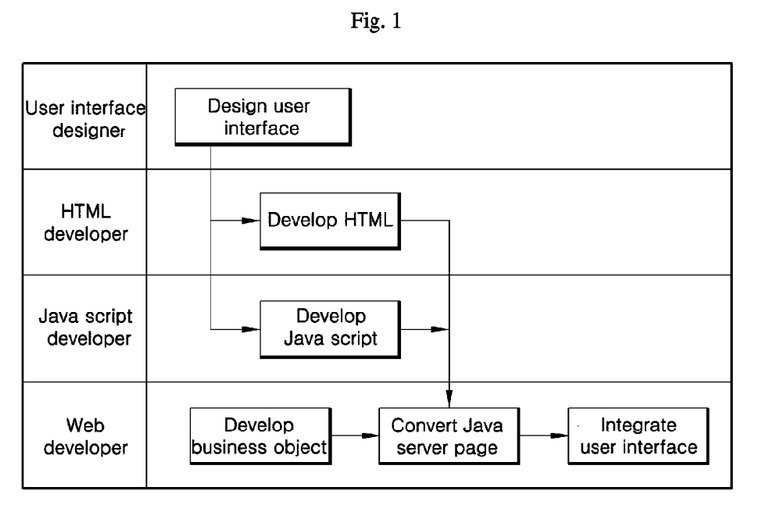
FIG. 1 is a view showing a general process of developing a user interface of a web service in a conventional manner.

FIG. 1 is a view showing a general process of developing a web application.

As shown in FIG. 1, the user interface development process includes a user interface object design step, a HyperText Markup Language (HTML) development step, a JAVA® script development step, a business object development step, a JAVA® server page conversion step, and a user interface object integration step.

Generally, although development of HTML is completed, the HTML cannot be immediately used in a service. This is because an HTML developer develops the HTML using not real data but constant values in the process of developing the HTML, and thus, the HTML itself developed by the HTML developer cannot express dynamic data used in a web service.

Accordingly, the JAVA® server page conversion step for converting the HMTL into server pages should be performed. The step removes constant values from HTML result material and converts the HTML to express dynamic data provided by a business object.

In addition, after the JAVA® server page conversion step is performed, a user interface object integration step for confirming and verifying actually operating user interfaces can be performed.

Some of the steps can be performed in parallel, and some of them can be performed in sequence. For example, as shown in FIG. 1, the HTML development step, the JAVA® script development step and the business object development step can be performed in parallel. Thereafter, the JAVA® server page conversion step and the user interface object integration step can be performed in sequence.

However, since the JAVA® server page conversion step and the user interface object integration step are performed through a programming language used by a web developer, the web developer should perform the processes, and thus a bottleneck problem may occur. Although additional web developers may be used in order to solve the bottleneck problem, since the web developers lack understanding of the HTML, user interface objects and the like, the addition of web developers is not generally very helpful to solve the bottleneck problem.

In addition, since the user interface object integration step for confirming user interfaces to be practically applied is performed in the last stage, it is difficult to relate the user interface to the overall user interface development project. That is, since the step of confirming and verifying practically operating web user interface objects is performed in the last stage, there is a problem in that it is difficult to feedback between developers and users and to confirm proper operation.

An invention titled "Java script-based web-client application framework, web contents processing method using the framework, and computer readable recording medium for implementing thereof" is disclosed in Korean Patent Laid-open Publication No. 2008-0070337. This publication relates to a framework configured using a JAVA® script, which is capable of improving modeling and reusability of objects using an Extensible Markup Language (XML) document and developing object-oriented client applications. However, since the user interface object integration step is performed by a web developer who manages data, the process may not be smoothly performed. In addition, since the user interface object confirmation step is performed in the last stage, errors in the user interface objects are found late.

SUMMARY OF THE INVENTION

Exemplary embodiments of the present invention provide a component-based JAVA® web application development framework used for creating a web page.

Exemplary embodiments of the present invention also provide a method of creating a web page using the component-based JAVA® web application development framework.

Additional features of the invention will be set forth in the description which follows, and in part will be apparent from the description, or may be learned by practice of the invention.

An exemplary embodiment of the present invention discloses a framework used for creating a web page, including a runtime engine to execute a method of a business object and return an execution result, a script component to perform preprocessing on an input value, to perform post-processing on the execution result, and to dynamically arrange a user interface object, and a core component to initialize the framework and confirm whether a request can be processed in the framework.

An exemplary embodiment of the present invention also discloses a method of creating a web page using a framework, including receiving a request, processing the request if the request can be processed in the framework, performing pre-processing, if preprocessing is defined, before processing the request, executing a method of a business object and returning an execution result, outputting the execution result if the method of the business object is normally executed, and performing post-processing if post-processing is defined and if the method of the business object is normally executed.

An exemplary embodiment of the present invention also discloses a non-transitory computer-readable medium including an executable program which, when executed, performs the steps of receiving a request, processing the request if the request can be processed in the framework, performing preprocessing, if preprocessing is defined, before processing the request, executing a method of a business object and returning an execution result, if the method of the business object is normally executed, outputting the execution result, and if the method of the business object is normally executed, performing post-processing if post-processing is defined.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

In the specification and claims, if a part is disclosed as connected to another part, this includes the case where the part is electrically connected to the other part with the intervention of another element therebetween, as well as the case where the part is directly connected to the other part. In addition, if a part includes a certain component, this means that the part may further include other components, unless otherwise specially indicated therein.

In the specification and claims, a business object is a component for performing an important logic of a service and returning a result data thereof. The business object relates only to contents of data, not to expression of the data. In addition, a user interface object is a user interface component used for configuring a unit service in a web page. The user interface object relates only to expression of data, not to content of the data.

Throughout the specification and claims, the programming language JAVA® is referred to, as well as related terms. It will be apparent to one of skill in the art that any other suitable programming language may be used in place of or in addition to JAVA® in order to practice the invention. Therefore, the invention should not be construed as limited by the use of JAVA® or any other particular programming language.

Hereinafter, the present invention will be described in detail with reference to the accompanying drawings.

Figure 2:
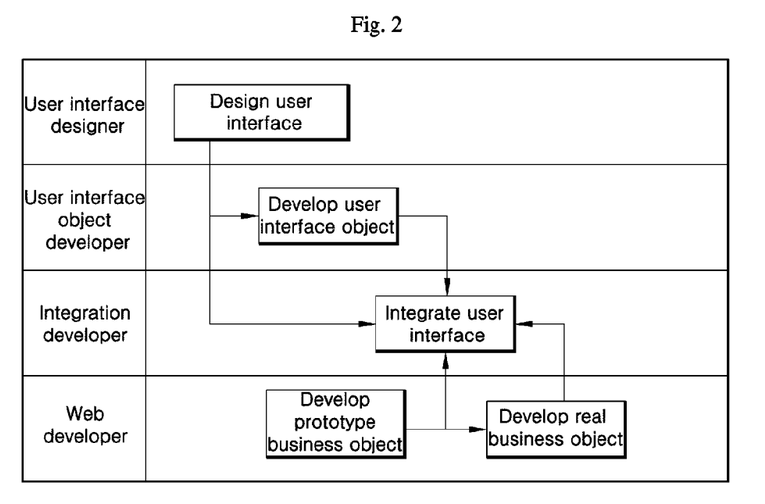
FIG. 2 is a view showing a process of developing a user interface of a web service according to an exemplary embodiment of the present invention.

FIG. 2 is a view showing a web application development process according to an exemplary embodiment of the present invention.

As shown in FIG. 2, a web application development process according to an exemplary embodiment of the present invention includes a user interface object design step, a user interface object development step, a user interface object integration step, a prototype business object development step, and a real business object development step.

Referring to FIG. 2, in the web application development process according to an exemplary embodiment of the present invention, the user interface object integration step can be performed by an HTML developer or an integration developer. That is, in order to solve the bottleneck problem of the conventional process, a user interface object can be integrated with a business object from the step of developing the user interface object and HTML.

In addition, the integration step may be iteratively performed from the start to the end of development, rather than being performed only once. That is, a consistent integration method is employed from the initial to final stages of development in order to reduce risk in the integration step, and thus, it is possible to reduce development period and minimize the risk.

Further, in order to perform the step of integrating user interface objects and business objects from the initial stage of development, a step of fetching and testing data of a business object should be performed. To this end, in a web application development process according to an exemplary embodiment of the present invention, before developing a real business object, it is possible to create a prototype business object and use the prototype business object in the user interface object integration step.

Accordingly, according to exemplary embodiments of the present invention, a web developer and a user interface developer can independently carry out their works without being affected by results of their works, and a consistent integration can be conducted during the development period.

Figure 3:
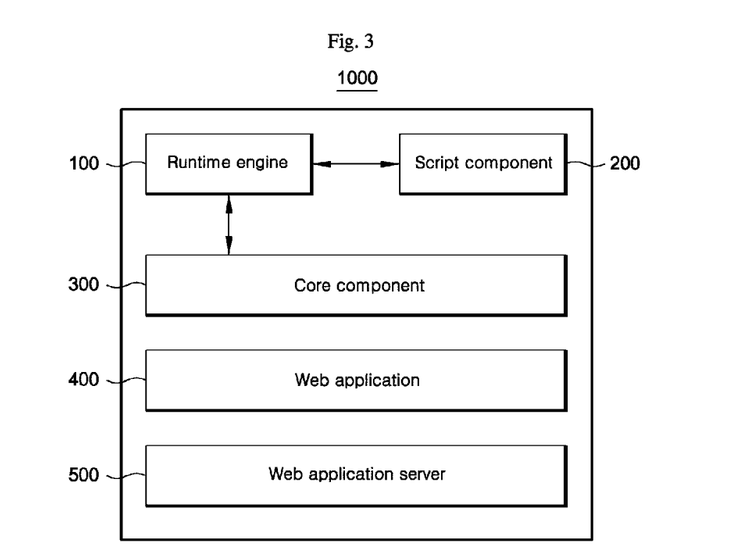
FIG. 3 is a view showing the detailed configuration of a user interface server framework (USF) 1000 according to an exemplary embodiment of the present invention.

FIG. 3 is a view showing the detailed configuration of a user interface server framework (USF) according to an exemplary embodiment of the present invention.

A USF 1000 according to an exemplary embodiment of the present invention is a component-based JAVA® web application development framework to provide a user with HTML, and allows a user interface developer to develop user interface objects and business objects for creating the HTML separately and integrate them. That is, the USF 1000 can provide a dynamic binding service for combining the business objects and the user interface objects in runtime.

The USF 1000 provides a variety of services to this end. First, the USF 1000 provides a function capable of developing business objects and user interface objects separately. Accordingly, a user interface developer can develop the user interface objects using only the function provided by the USF 1000, without separately learning a programming language used by a web developer. The USF 1000 provides an XML-based set file and an HTML creating template engine in order to provide the function capable of developing the business objects and the user interface objects separately.

In addition, after a user interface object is developed, there is needed a function for combining and showing the user interface object with real service data. To this end, the USF 1000 provides a function of locally or remotely calling and executing a business object and receiving a result of the execution. For example, the USF 1000 may call and execute a local business object through an open source framework connection function. In addition, the USF 1000 supports a remote procedure call (RPC) protocol and a messaging platform protocol capable of transmitting and managing messages between applications, thereby making it possible to remotely call and execute a business object.

Further, the USF 1000 may call and execute a business object on the basis of XML. For example, the USF 1000 may use a method of describing a name of a business object to be executed, a name of a template type, parameters to be transferred, data to be returned, and the like in the XML.

Also, the USF 1000 provides a function of analyzing and executing a template page based on an open source template engine and then converting it into HTML. Furthermore, since a user interface cannot be dynamically configured if only the open source template engine is used, the USF 1000 provides a function capable of dynamically arranging user interface objects on a JAVA® server page by defining template directives. For example, a user interface developer may arrange the user interface objects on a screen in such a manner that he or she desires by utilizing a JAVA® script engine embedded in the USF 1000.

In addition, the USF 1000 provides various types of web application results so as to move to another page depending on a situation, in addition to the HTML that is a general result of executing a web page. For example, the USF 1000 provides various types of results, such as a template for creating and outputting an execution result in the form of a template, a redirect for redirecting the execution result to a specified Uniform Resource Locator (URL), a forward for forwarding the execution result to a specified URL, and a direct for directly outputting the execution result without a page, thereby appropriately outputting the execution result according to the result type in response to a web application.

Also, the USF 1000 provides application developers with an environment for making it possible to perform additional work in response to a user's request. For example, the USF 1000 may provide the application developers with an environment for making it possible to perform additional work that can be handled and processed in an application step, such as a permission or a cookie.

As shown in FIG. 3, the USF 1000 according to an exemplary embodiment of the present invention includes a runtime engine 100, a script component 200, a core component 300, a web application base module 400, and a web application server 500.

The runtime engine 100 executes a method of a business object and outputs a result of executing the business object in a variety of ways depending on result types declared in an XML-based set file in response to a user's request. In addition, the runtime engine 100 allows a web developer to access a variety of resources used in the USF 1000 and provides the web developer with interfaces to the resources. Furthermore, the runtime engine 100 may manage debugging information when the method of the business object is abnormally executed or an exception condition occurs.

Based on a JAVA® script, the script component 200 may perform preprocessing on user input values defined in the XML-based set file before execution of a method of a business object and post-processing for handling a result of the execution of the method of the business object. In addition, the script component 200 may control user interface objects to dynamically arrange them. For example, the script component 200 may dynamically arrange the user interface objects based on the XML-based set file, or by using template directives. In addition, the script component 200 manages the user interface objects using an HTML template and renders and provides them as HTML in runtime.

The core component 300 confirms whether the user's request can be executed in the USF 1000, and then allows the user's request to be executed if the user's request can be executed therein. In addition, the core component 300 may serve to initialize the framework.

The web application base module 400, which is a JAVA®-based web application framework, is a web application development platform integrating XWork framework, reusable user interface templates, and JAVABEANS®. The web application base module 400 may be designed so that non-core business objects are declaratively processed and developers can concentrate on implementing only core business objects needed to develop web applications.

The web application server 500 is middleware (software engine) for executing applications in a user's computer or apparatus through HTTP on the Internet. The web application server 500, which is to execute dynamic server contents, is distinguished from general web servers and mainly operates with a database server. For example, Tomcat, RESIN®, JRun or the like can be the web application server 500.

Figure 4:
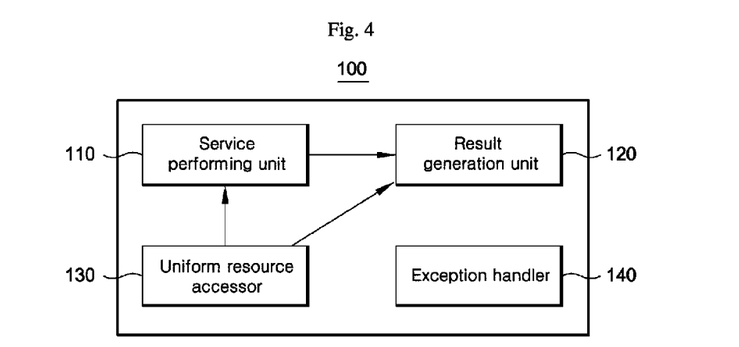
FIG. 4 is a view showing the detailed configuration of a runtime engine 100 of the USF 1000 according to an exemplary embodiment of the present invention.

FIG. 4 is a view showing a detailed configuration of the runtime engine 100 of the USF 1000 according to an exemplary embodiment of the present invention.

As shown in FIG. 4, the runtime engine 100 of the USF 1000 according to an exemplary embodiment of the present invention includes a service performing unit 110, a result generation unit 120, a uniform resource accessor (URA) 130, and an exception handler 140.

The service performing unit 110 executes a method of a business object declared in an XML-based set file. The business object declared in the XML-based set file is a component to perform an important aspect of a corresponding service and return its result data. The service performing unit 110 executes the method of the business object declared in the XML-based set file by executing the method through a request broker. The request broker allows a web developer to use a remote procedure call (RPC) protocol under a multi-layer structure service environment, through a messaging platform.

The result generation unit 120 may output a result of the method of the business object executed by the service performing unit 110 in a variety of ways depending on result types declared in the XML-based set file. For example, the result generation unit 120 may provide various types of results, such as a template for creating and outputting an execution result in the form of a template, a redirect for redirecting the execution result to a specified URL, a forward for forwarding the execution result to a specified URL, and a direct for directly outputting the execution result without a page, thereby appropriately outputting the result of executing the method of the business object according to the result type declared in the XML-based set file.

The URA 130 may provide interfaces for accessing and using a variety of resources of the USF 1000. For example, the URA 130 can be connected to the service performing unit 110 or the result generation unit 120 through a request broker that can be connected to an open source framework and supports an RPC protocol environment, which is an enterprise standard, a messaging platform environment, or a local environment. The URA 130 may access a business object exposed outside through an RPC protocol connector for JAVA®/C++ in the RPC protocol environment or through a JAVA®/C++ request broker in the messaging platform environment.

The exception handler 140 may manage debugging information when the method of the business object is abnormally executed or an exception condition occurs.

Figure 5:
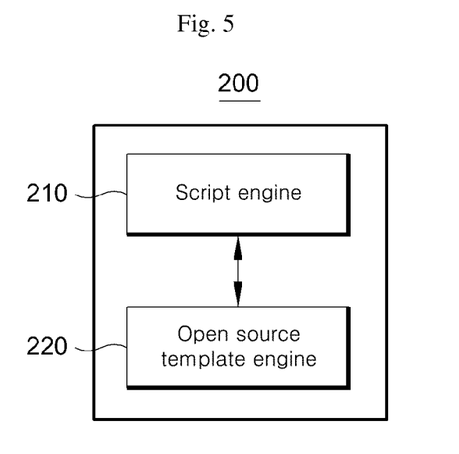
FIG. 5 is a view showing the detailed configuration of a script component 200 of the USF 1000 according to an exemplary embodiment of the present invention.

FIG. 5 is a view showing a detailed configuration of the script component 200 of the USF 1000 according to an exemplary embodiment of the present invention.

As shown in FIG. 5, the script component 200 according to an exemplary embodiment of the present invention includes a script engine 210 and an open source template engine 220.

The script engine 210 may perform preprocessing of user input values defined in the XML-based set file before the execution of a method of a business object and post-processing for handling a result of the execution of the method of the business object after the executing the method of the business object based on a JAVA® script. In addition, the script engine 210 may control user interface objects in order to dynamically arrange the user interface objects.

The open source template engine 220 may manage user interface objects using an HTML template and dynamically configure final result material in runtime by connecting a user interface object to a business object. In addition, when the USF 1000 defines template directives, the defined directives may be dynamically reflected in runtime through interfaces provided by the open source template engine 220.

Figure 6:
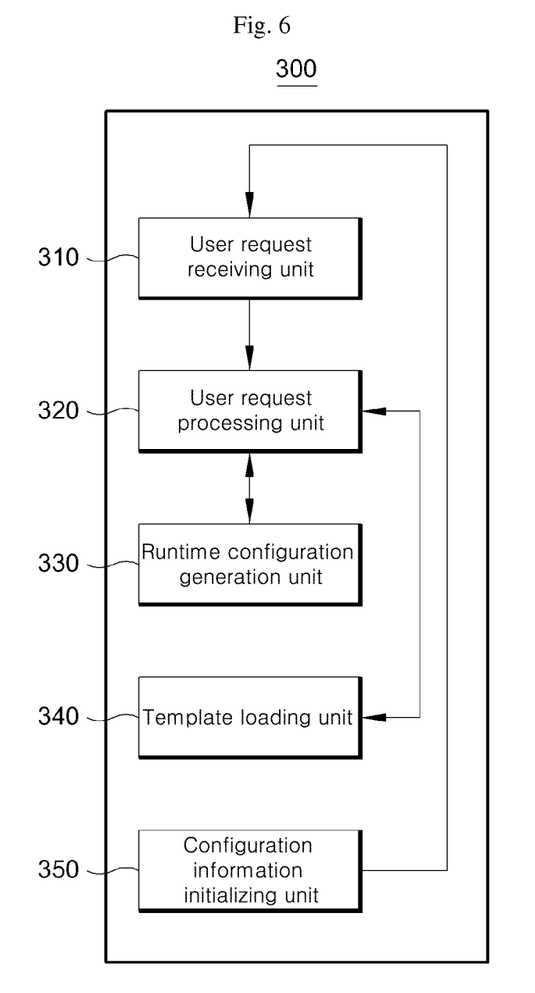
FIG. 6 is a view showing the detailed configuration of a core component 300 of the USF 1000 according to an exemplary embodiment of the present invention.

FIG. 6 is a view showing the detailed configuration of the core component 300 of the USF 1000 according to an exemplary embodiment of the present invention.

As shown in FIG. 6, the core component 300 includes a user request receiving unit 310, a user request processing unit 320, a runtime configuration generation unit 330, a template loading unit 340, and a configuration information initializing unit 350.

The user request receiving unit 310 may receive a user's request through a web browser. The received user's request may be converted into an HttpServletRequest object in a web application server and transferred to the user request receiving unit 310. The user request receiving unit 310 confirms whether the received user's request can be processed in the USF 1000 and calls the user request processing unit 320 to process the user's request if the received user's request can be processed in the USF 1000.

If the user's request received by the user request receiving unit 310 can be processed in the USF 1000, the user request processing unit 320 processes the user's request. The user request processing unit 320 reads an execution model defined in an XML-based dynamic set file through the runtime configuration generation unit 330 and then processes the user's request.

The runtime configuration generation unit 330 may read user command information defined in the XML-based dynamic set file and create the execution model for the user request processing unit 320.

The template loading unit 340 may serve to load and initialize a template method. For example, the template loading unit 340 may load and initialize a template method developed by a user or a template method of the open source template engine, which is basically used in the USF 1000.

The configuration information initializing unit 350 may serve to read previously set configuration information and then initialize it before the USF 1000 creates business objects and user interface objects.

Figure 7:
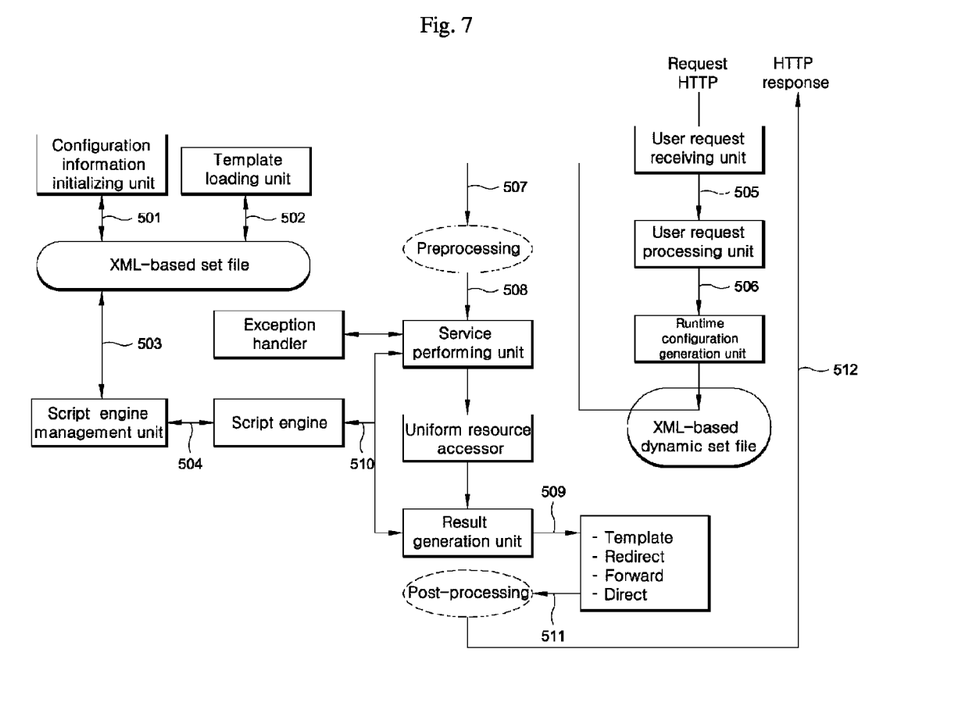
FIG. 7 is a flowchart illustrating a process of integrating a user interface object and a business object performed in the USF 1000 according to an exemplary embodiment of the present invention.

FIG. 7 is a flowchart illustrating a process of integrating a user interface object and a business object performed in the USF 1000 according to an exemplary embodiment of the present invention.

In step 501, the configuration information initializing unit 350 may read and initialize configuration information and set information of the USF 1000 registered in a web server.

In step 502, the template loading unit 340 may execute a template method plug-in registered in the set file of the USF 1000 set on XML. The template method plug-in may read and cache a template method that can be used in the USF 1000.

In step 503, a script engine management unit capable of managing and controlling the script engine 210 may read the set file of the USF 1000 and initialize the script engine 210.

In step 504, after initializing the script engine 210, the script engine management unit may control user interface objects to dynamically arrange them. For example, the script engine management unit may dynamically arrange the user interface objects based on the XML-based set file, or by using template directives. For example, when initializing a web application context, the script engine management unit may load a file, for example, a '.js' file, based on a value of 'customer-script-die' if the value of 'enable-scripting' among inputted parameters is 'true'. Then, the script engine management unit may identify the type of the script engine 210 based on the extension of s the script file, fetch a list of script engine factory classes from the script engine library loaded in the classpath, and initialize the script engine 210 according to the script engine factory.

In step 505, if a user requests the USF 1000 to create a business object through a web browser, the user request receiving unit 310 receives the user's request through the web browser. The received user's request may be converted into an HttpServletRequest object in the web application server and transferred to the user request receiving unit 310. The user request receiving unit 310 may confirm whether the received user's request can be processed in the USF 1000 and call the user request processing unit 320 to process the user's request if the received user's request can be processed in the USF 1000.

In step 506, if the user's request received by the user request receiving unit 310 can be processed in the USF 1000, the user request processing unit 320 processes the user's request. If the runtime configuration generation unit 330 reads user command information defined in the XML-based dynamic set file and creates an execution model needed by the user request processing unit 320, the user request processing unit 320 may read the execution model through the runtime configuration generation unit 330 and process the user's request.

Steps 507 to 511 are a flow of an operation performed by the user request processing unit 320 to read an execution model defined in the XML-based set file and create a business object requested by the user.

In step 507, before the service performing unit 110 performs the process of creating a business object, if there is a preprocessing defined by a user, the script component 200 performs the preprocessing based on a JAVA® script.

In step 508, the service performing unit 110 executes a method of a business object based on the XML-based set file in response to the user's request. The service performing unit 110 also returns the result of the execution of the method. The service performing unit 110 may execute the method of the business object declared on an XML script by executing the method through a request broker. In addition, when the service performing unit 110 processes the user's request in step 508, the request broker may allow the service performing unit 110 to use an RPC protocol of a multi-layer service environment through the messaging platform.

However, if the method of the business object is abnormally executed or an exception condition occurs in step 508, the exception handler 140 may manage debugging information thereon.

If the method of the business object is normally executed in step 508, in step 509, the result generation unit 120 outputs a result of the method of the business object executed by the service performing unit 110 in a variety of ways depending on result types declared in the XML-based set file. The result type may be a variety of responses, such as a template, redirect, forward, direct, and the like. In addition, the result of executing the business object may be provided to a user or a web developer through a web browser in a HTML form.

In step 510, the result generation unit 120 transfers the result of executing the method of the business object to the script engine 210, and the script engine 210 controls data of the received business object and user interface object in order to integrate the business object and the user interface object. In addition, the business object and the user interface object may be dynamically combined by the open source template engine 220 in runtime and provided as an HTML web page.

When the service performing unit 110 normally executes the method of the business object and the result generation unit 120 normally processes the result of the execution, the script component 200 performs post-processing in step 511 based on the JAVA® script if there is a post-processing defined by the user.

In step 512, the runtime engine 100 may transfer the result of executing the method of the business object outputted by the result generation unit 120 in step 509 to the user. The runtime engine 100 may convert the result of executing the method of the business object into an HttpServletResponse form and transfer the result to the user as an HTML web page, and the result may be transferred in an HTML form through a web browser.

An exemplary embodiment of the present invention may be implemented in the form of a recording medium including a command that can be executed by a computer, such as a program module executed in a computer. The computer readable medium may be a medium that can be accessed by a computer, including all of volatile and non-volatile media and detachable and non-detachable media. In addition, the computer readable medium may include both of computer storage media and communication media. The computer storage media includes all of volatile and non-volatile media and detachable and non-detachable media for storing information such as computer readable commands, data structures, program modules, or other data. The communication media may include modulated data signals, such as computer readable commands, data structures, program modules, or sub-carriers, or other transmission mechanisms, as well as information transfer media.

The aforementioned descriptions of exemplary embodiments of the present invention are only for illustrative purposes, and it will be apparent that those skilled in the art can make various modifications thereto without changing the technical spirit and essential features of the invention. Thus, it should be understood that the exemplary embodiments described above are merely for illustrative purposes and not for limitation purposes in all aspects. For example, each component described as a single type can be implemented in a distributed type, and components described as distributed can be implemented in a combined form.

The true scope of the present invention should be defined by the technical spirit of the appended claims rather than the above detailed descriptions. In addition, the present invention should be interpreted to encompass all modifications and changes that would occur from the spirit and scope of the claims and the equivalence thereof.

According to exemplary embodiments of the present invention, a user interface developer is provided with an environment for developing user interface objects independently from business objects, and a user interface developer, may call and execute a separately developed business object and confirm its result.

According to exemplary embodiments of the present invention, a web developer and a user interface developer can independently carry out their works without being influenced by results of their works, and a consistent integration can be conducted during the development period.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A web page creating system, comprising:
 a runtime engine to execute a method of a business object and return an execution result in response to a request;
 a script component to perform preprocessing on an input value, to perform post-processing on the execution result, to integrate the business object with a separate user interface object in runtime, and to dynamically arrange the user interface object using a Markup Language template and to render and provide the user interface object as a markup language in runtime;
 a core component to initialize a framework and confirm whether the request can be processed in the framework; and
 a processor to execute one or more of the runtime engine, the script component, and the core component,
 wherein a prototype business object is created and used during the integration of the business object with the separate user interface object.

2. The system of claim 1, wherein the runtime engine comprises:

a service performing unit to execute the method of the business object;

a result generation unit to output the execution result if the method of the business object is normally executed;

a uniform resource accessor to provide at least one interface for accessing and using resources of the framework; and an exception handler to manage debugging information if the method of the business object is abnormally executed or if an exception condition occurs.

3. The system of claim 2, wherein, if the method of the business object is normally executed, the execution result is outputted according to a type defined in a set file.

4. The system of claim 1, wherein the script component comprises:

a script engine to perform the preprocessing and the post-processing, and to control the user interface object in order to dynamically arrange the user interface object; and an open source template engine to manage the user interface object using a HyperText Markup Language (HTML) template and to render and provide the user interface object as HTML in runtime.

5. The system of claim 4, wherein the script engine performs, based on a set file, at least one of preprocessing, post-processing, and controlling the user interface object.

6. The system of claim 2, wherein the execution result comprises at least one of:

a template for creating and outputting the execution result in a form of the template;

a redirect for redirecting the execution result to a first Uniform Resource Locator (URL);

a forward for forwarding the execution result to a second URL; and a direct for directly outputting the execution result.

7. The system of claim 1, wherein the script component performs the preprocessing, the post-processing, and the dynamically arranging a user interface object based on a script.

8. The system of claim 1, further comprising a dynamic binding service for combining the business object and the user interface object in runtime.

9. The system of claim 1, wherein the script component dynamically arranges a plurality of user interface objects using template directives defined in the framework.

10. The system of claim 1, wherein the script component dynamically arranges a plurality of user interface objects with respect to one another.

11. The system of claim 1, wherein the business object is a component configured to perform a logic of a service and return a result data thereof.

12. A method of creating a web page using a framework, comprising:

receiving a request;

processing the request if the request can be processed in the framework;

performing preprocessing, if preprocessing is defined, before processing the request;

executing a method of a business object, integrating the business object with a separate user interface object in runtime, dynamically arranging the user interface object using template directives defined in the framework, rendering the user interface object as a markup language in runtime, and returning an execution result;

outputting the execution result in response to normal execution of the method of the business object;

performing post-processing in response to the normal execution of the method of the business object, if post-processing is defined; and creating a prototype business object and using the prototype business object during the integration of the business object with the separate user interface object.

13. The method of claim 12, wherein, if the method of the business object is normally executed, the execution result is outputted according to a type defined in a set file.

14. The method of claim 12, wherein the execution result comprises at least one of:

a template for creating and outputting the execution result in a form of the template;

a redirect for redirecting the execution result to a first Uniform Resource Locator (URL);

a forward for forwarding the execution result to a second URL; and a direct for directly outputting the execution result.

15. The method of claim 12, further comprising managing debugging information in response to abnormal execution of the method of the business object or in response to an exception condition.

16. The method of claim 12, further comprising providing the execution result in HTML form.

17. The method of claim 12, wherein the preprocessing and the post-processing are performed based on a script.

18. The method of claim 12, wherein the executing of the method further comprises dynamically arranging a plurality of user interface objects.

19. The method of claim 12, wherein the business object and the user interface object are dynamically combined and provided as an HTML web page in runtime.

20. The method of claim 12, wherein the user interface object is dynamically arranged based on a set file.

21. The method of claim 12, further comprising dynamically arranging a plurality of user interface objects with respect to one another.

22. The method of claim 12, wherein the business object is a component configured to perform a logic of a service and return a result data thereof.

23. A non-transitory computer-readable medium comprising an executable program which, when executed, performs the steps of:

receiving a request;

processing the request if the request can be processed in a framework;

performing preprocessing, if preprocessing is defined, before processing the request;

executing a method of a business object, integrating the business object with a separate user interface object in runtime, dynamically arranging the user interface object using template directives defined in the framework, rendering the user interface object as a markup language in runtime, and returning an execution result;

outputting the execution result in response to normal execution of the method of the business object;

performing post-processing in response to the normal execution of the method of the business object, if post-processing is defined; and creating a prototype business object and using the prototype business object during the integration of the business object with the separate user interface object.

* * * * *